Patented May 30, 1939

2,160,621

UNITED STATES PATENT OFFICE 2,160,621

METHOD FOR THE PRODUCTION OF SACCHAROSONIC ACIDS AND THEIR SALTS

Heinz Ohle, Hohen Neuendorf, near Berlin, Germany

No Drawing. Application December 22, 1933, Serial No. 703,636. In Germany December 23, 1932

15 Claims. (Cl. 260—344)

The present invention relates to organic compounds and more particularly to saccharosonic acids and methods of making same.

One object of the invention is the production of saccharosonic acids from osonic acids having the following structural formula:

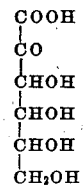

For this purpose, osonic acids, such as the glucosonic acid having the following structural formula:

(2-keto-gluconic acid) which has become readily available by the work of Ohle and his collaborators (compare: Berichte der deutschen chemischen Gesellschaft, vol. 58, p. 2577 (1925); vol. 60, p. 1159 (1927); vol. 63, p. 843 (1930)) and other representatives of this group of acids, as they are for instance obtained by the cleavage of osazones of reducing sugars and oxidation of the osones according to Neuberg and Kitasato (compare: Biochemische Zeitschrift, vol 183, p. 485 (1927); vol. 207, p. 217 (1929)) are used as starting materials. The esters of said osonic acids or their lactones are treated with basic agents, whereby, besides normal saponification products, varying amounts of saccharosonic acids are formed. Saccharosonic acid lactones have the following representative formula:

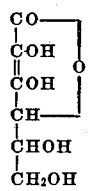

D-gluco saccharosonic acid lactone has the following structural formula:

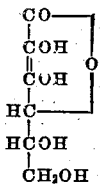

Osonic acid lactone may have either of the following structural formulae:

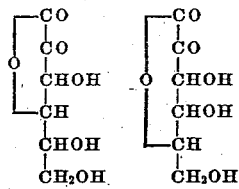

In order to suppress normal saponification as much as possible and to obtain an optimum in yield of saccharosonic acids, the treatment of the osonic acid derivatives with basic agents is preferably carried out in a medium the reaction of which is as neutral as possible. There are several ways to achieve this purpose of which the following may be mentioned especially:

(1) The basic agents, such as alkali or alkaline earth metal hydroxides are added gradually in such small amounts to the aqueous solutions of the osonic acid derivatives that the basic agent as soon as it is added is consumed so that the solution remains practically neutral.

(2) Alkali or alkaline earth metal salts of weak acids (buffer solutions) are employed as basic agents, such as sodium bicarbonate, sodium carbonate, ammonium carbonate, calcium carbonate, barium carbonate, disodium phosphate and the like.

(3) Weak tertiary nitrogen organic bases, such as pyridine, quinoline, dimethylaniline, and the like are used.

(4) Organic bases, such as alkali or alkaline earth metal alkoholates are caused to act upon the alcoholic solutions or suspensions of the esters, lactones or acylated lactones of the osonic acids.

The products obtained from said osonic acids correspond to the general formula $C_6H_8O_6$; hence, they contain one water molecule less in their molecule than the starting materials, the osonic acids of the general formula $C_6H_{10}O_7$. A characteristic property of these saccharosonic acids is their capability of being very easily oxidized. They reduce in acid solution 1 molecule of chlorine, bromine, or iodine to the corresponding hydrogen halides, in alkaline solution two molecules hypoiodite, while silver nitrate is reduced to silver in neutral as well as weakly acid solution and Fehling's solution instantaneously at room temperature. Also quinone and quinoid dyestuffs are reduced. On oxidation with quinone in acid solution, 2,3-diketo hexonic acids are formed which yield with 2 molecules of o-phenylendiamine difficulty soluble crystalline quinoxaline derivatives of the general formula $C_{18}H_{18}O_4N_4$. The latter reaction may be used for further characterization of the new products.

When making said saccharosonic acids it is not necessary to isolate the esters of the osonic acids or their lactones in crystalline form, but it is possible to use the alcoholic solutions of said derivatives as they are obtained on producing the same as starting materials and to subject said solutions to the above described treatment.

The process of making glucosaccharosonic acid may be simplified by using as starting material the crude potassium salt of the diacetone glucosonic acid, as it is obtained by oxidation of β-diacetone fructose.

The saccharosonic acids, especially the readily available glucosaccharosonic acid are of great therapeutical and also technical value. They may, for instance, be used for the treatment of scurvy and similar diseases, as substitute for carbohydrates in diabetes, as disinfectants and medicinal agents due to their high bactericidal effect and their being non-poisonous for human beings and higher animals, or on account of their strong reducing power as photographic developers.

In order to illustrate the invention more clearly, several examples are given, without, however, limiting the same to them.

*Example 1*

100 grams of glucosonic acid methyl ester having the following structural formula:

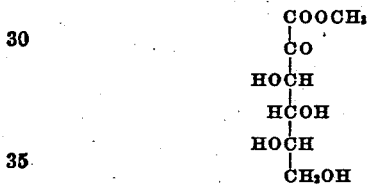

are dissolved at 60–70° C. in 200 cc. of water. The equivalent amount of sodium bicarbonate is gradually added to this solution whereby the latter is kept at the above temperature until the development of carbon dioxide has ceased and the solution reacts neutral against litmus paper. On cooling, 50 grams of the pure sodium salt of saccharosonic acid, $C_6H_7O_6Na.H_2O$ crystallizes. Its aqueous solution shows a specific rotation of $(\alpha)_D^{20}=+97°$. On concentrating the mother liquor by evaporation in vacuo at 30° C. and cooling to 0° C. another portion of 10 to 20 grams of the salt of less purity are obtained, which, nevertheless, can also be used without further purification. The remaining mother liquor yields on further concentration by evaporation the sodium salt of glucosonic acid, which may be retransformed into the methyl-ester. The latter is again treated as described above. In this manner yields of 90% and more are obtained.

Instead of the methyl ester other esters of the glucosonic acid, such as the ethyl, propyl, isopropyl ester and the like may be used.

The free glucosaccharosonic acid is obtained by dissolving the sodium salt in the equivalent amount of dilute sulfuric acid, evaporating to dryness the solution in a vacuum at 30° C. and extracting the residue by means of boiling alcohol. On cooling the glucosaccharosonic acid crystallizes in needles of the melting point 160–164° C. It decomposes at its melting point. Its aqueous solution shows a rotation of $(\alpha)_D^{20}=-28$.

*Example 2*

100 grams of the sodium salt of glucosonic acid are boiled in 500 cc. of methanol and the equivalent amount of concentrated sulfuric acid, until the insoluble salt does not any more reduce Fehling's solution. The liquid is filtered while still hot, and 500 cc. of an aqueous solution of the equivalent amount of sodium bicarbonate or sodium carbonate or sodium hydroxide are gradually added thereto. While still hot, the sodium salt of the saccharosonic acid precipitates. After cooling to room temperature, the precipitated sodium saccharosonate is filtered off by suction, and the mother liquor is evaporated in a vacuum in order to recover the unreacted sodium glucosonate. The yield is the same as in Example 1.

*Example 3*

1 kilogram of the potassium salt of diacetone glucosonic acid having the following structural formula:

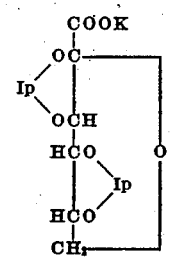

wherein Ip indicates an isopropyl group is heated to 50° C. with 4 liters of methanol and 2 liters of 5 n. sulfuric acid until the rotation value remains constant. After removing the potassium sulfate the resulting solution is diluted with 4 liters of water and is neutralized at 60–70° C. with barium carbonate or calcium carbonate. The dissolved barium or calcium salt is precipitated with the calculated amount of sodium sulfate. The barium or calcium sulfate respectively is filtered off and the filtrate is concentrated by evaporation in order to effect fractionated crystallization according to Example 1.

*Example 4*

21 grams of glucosonic acid methyl ester are heated to 60–70° C. in 40 cc. of water and 10 cc. of pyridine and are kept at this temperature until the rotation value remains constant. After cooling, the equivalent amount of sodium hydroxide solution is added and the resulting solution is subjected to a fractionated crystallization process as described in Example 1.

*Example 5*

208 grams of finely pulverized d-glucosonic acid methyl ester are added to a freshly prepared solution of 23 grams of metallic sodium in absolute methanol. The reaction mixture is heated for 2 hours at 50–60° C., whereby the ester gradually dissolves. At the same time a yellowish to brownish microcrystalline precipitate separates which is filtered off. 200 cc. of water are added to the filtrate whereby about 50% of the theoretical yield of the sodium salt of the d-glucosaccharosonic acid precipitate. The above mentioned yellowish microcrystalline precipitate is dissolved in 100 cc. of water. About 30% of the theoretical yield of sodium saccharosonate crystallize from this solution on standing, so that the total yield is about 80%.

Instead of methanol other anhydrous alcohols may be used and instead of metallic sodium other alkali or alkaline earth metals may be used.

*Example 6*

30.3 grams of triacetyl glucosonic acid lactone are added to a solution of 2.5 grams of sodium in 300 cc. of absolute methanol. The obtained solution is heated for 1 hour at 50–60° C. After cooling, 30 cc. of water are added thereto, whereby about 80% of the theoretical yield of sodium saccharosonate are precipitated.

In all these examples, of course, modifications and changes may be made by those skilled in the art in accordance with the principles set forth herein and in the claims annexed hereto, as the invention is by no means limited to the specific examples which merely serve to illustrate the same. By the term "esters" of osonic acid is meant the esters formed by the esterification of said acids by means of organic hydroxy compounds, such as alcohols, or the like or in other manner so that the COOH group is neutralized by an organic group. By the term "saccharosonic acid compounds" I intend to include not only the free acids themselves but also salts thereof.

What I claim is:—

1. A method for the production of saccharosonic acid compounds of the group consisting of the free acids and their alkali metal, alkaline earth metal, and tertiary amine salts which comprises subjecting compounds selected from the group of compounds consisting of esters, lactones and acylated lactones of osonic acids to the action of agents of alkaline reaction corresponding to the above salts, while maintaining the reaction of the reaction mixture near the neutral point.

2. A method for the production of saccharosonic acid compounds of the group consisting of the free acids and their alkali metal, alkaline earth metal, and tertiary amine salts which comprises subjecting compounds selected from the group of compounds consisting of esters, lactones and acylated lactones of osonic acids to the action of agents of alkaline reaction corresponding to the above salts, while maintaining the reaction of the reaction mixture near the neutral point and isolating said reaction products.

3. A method for the production of saccharosonic acid compounds of the group consisting of the free acids and their alkali metal, alkaline earth metal, and tertiary amine salts which comprises subjecting compounds selected from the group of compounds consisting of esters, lactones and acylated lactones of osonic acids to the action of agents of alkaline reaction corresponding to the above salts, while maintaining the reaction of the reaction mixture near the neutral point and separating the saccharosonic acids from unchanged starting material which is recovered in the form of the salts of the free osonic acids.

4. A method for the production of saccharosonic acid compounds of the group consisting of the free acids and their alkali metal, alkaline earth metal, and tertiary amine salts which comprises subjecting compounds selected from the group of compounds consisting of esters, lactones and acylated lactones of osonic acids to the action of aqueous solutions of agents of alkaline reaction corresponding to the above salts, while maintaining the reaction of the reaction mixture near the neutral point.

5. A method for the production of saccharosonic acid compounds of the group consisting of the free acids and their alkali metal, alkaline earth metal, and tertiary amine salts which comprises subjecting compounds selected from the group of compounds consisting of esters, lactones and acylated lactones of osonic acids to the action of aqueous solutions of agents of alkaline reaction corresponding to the above salts, while maintaining the reaction of the reaction mixture near the neutral point and separating the saccharosonic acids from unchanged starting material which is recovered in the form of the salts of the free osonic acids.

6. A method for the production of saccharosonic acid compounds of the group consisting of the free acids and their alkali metal, alkaline earth metal, and tertiary amine salts which comprises gradually adding in small amounts aqueous solutions of an alkaline metal hydroxide to the aqueous solutions of compounds selected from the group of compounds consisting of esters, lactones and acylated lactones of osonic acids, thereby maintaining the reaction of the reaction mixture near the neutral point.

7. A method for the production of saccharosonic acid compounds of the group consisting of the free acids and their alkali metal, alkaline earth metal, and tertiary amine salts which comprises subjecting compounds selected from the group of compounds consisting of esters, lactones and acylated lactones of osonic acids to the action of salts of weak acids having an alkaline reaction.

8. A method for the production of saccharosonic acid compounds of the group consisting of the free acids and their alkali metal, alkaline earth metal, and tertiary amine salts which comprises subjecting compounds selected from the group of compounds consisting of esters, lactones and acylated lactones of osonic acids to the action of salts of weak acids having an alkaline reaction and separating the saccharosonic acids from unchanged starting material which is recovered in the form of the salts of the free osonic acids.

9. A method for the production of saccharosonic acid compounds of the group consisting of the free acids and their alkali metal, alkaline earth metal, and tertiary amine salts which comprises subjecting compounds selected from the group of compounds consisting of esters, lactones and acylated lactones of osonic acids to the action of organic bases taken from the class consisting of tertiary nitrogen bases and alcoholates.

10. A method for the production of saccharosonic acid compounds of the group consisting of the free acids and their alkali metal, alkaline earth metal, and tertiary amine salts which comprises subjecting compounds selected from the group of compounds consisting of esters, lactones and acylated lactones of osonic acids in an alcoholic medium to the action of alcoholates selected from the group of compounds consisting of alkali and alkaline earth metal alcoholates.

11. A method for the production of saccharosonic acid compounds of the group consisting of the free acids and their alkali metal, alkaline earth metal, and tertiary amine salts which comprises simultaneously hydrolizing and esterifying salts of diacetone glucosonic acid with aqueous-alcoholic sulfuric acid and thereafter treating the esters obtained according to the process claimed in claim 1.

12. A method for the production of saccharosonic acid compounds of the group consisting of the free acids and their alkali metal, alkaline earth metal, and tertiary amine salts which comprises subjecting osonic acid compounds taken from the class consisting of esters, lactones, and acylated lactones to the action of agents of alkaline reaction, while maintaining the reaction mixture near the neutral point.

13. The sodium salt of glucosaccharosonic acid of the general formula $C_6H_7O_6NaH_2O$, showing in aqueous solution a specific value of rotation of $(\alpha)_D^{20} = +97°$.

14. The glucosaccharosonic acid lactone of the general formula $C_6H_8O_6$ and the melting point 160–164° C., said compound decomposing at its melting point, its aqueous solution showing a specific value of rotation of $(\alpha)_D^{20} = -28°$.

15. The glucosaccharosonic acid compounds of the general formula $C_6H_7O_5OX$, wherein X represents a member of the group consisting of hydrogen, alkali metals and alkali earth metals.

HEINZ OHLE.